United States Patent [19]

Sanders

[11] Patent Number: 4,718,688
[45] Date of Patent: Jan. 12, 1988

[54] COLLAPSIBLE BICYCLES WITH TRIANGULAR FRAMES

[76] Inventor: Mark A. Sanders, 16 Green Lane, Windsor, Berkshire, United Kingdom

[21] Appl. No.: 945,101
[22] PCT Filed: Feb. 24, 1986
[86] PCT No.: PCT/GB86/00100
§ 371 Date: Oct. 16, 1986
§ 102(e) Date: Oct. 16, 1986
[87] PCT Pub. No.: WO86/05155
PCT Pub. Date: Sep. 12, 1986

[30] Foreign Application Priority Data

Feb. 27, 1985 [GB] United Kingdom ............... 8505070

[51] Int. Cl.4 ............................................. B62K 15/00
[52] U.S. Cl. ..................................... 280/278; 280/287
[58] Field of Search .................... 280/278, 287, 281 R

[56] References Cited

U.S. PATENT DOCUMENTS 3,990,717 11/1976 Best .................................... 280/278

FOREIGN PATENT DOCUMENTS

110963 10/1897 Fed. Rep. of Germany ...... 280/287
115840 4/1898 Fed. Rep. of Germany ...... 280/287
2804933 8/1978 Fed. Rep. of Germany ...... 280/287

Primary Examiner—John A. Pekar
Attorney, Agent, or Firm—Young & Thompson

[57] ABSTRACT

A collapsible bicycle comprises a triangular frame formed from three struts A, B and C. The bottom strut C can be disconnected from the forward strut B by operating a releasable pivot joint J so that the strut C can be folded up against the rear strut A. A universal joint between struts A and B then allows these two struts to be folded to lie alongside one another with the pair of wheels W1 and W2 lying side by side. Cranked portions 7 and 8 of the struts A and B provide offset supports for the wheels to one side only so that they can readily be positioned side by side and ideally locked together. The folded framework can then be transported, if required, by grasping a support 6 or handlebars H and running the unit along the ground on the pair of wheels W1 and W2. A saddle S is adjustably mounted on the rear strut A by a sliding support 39 having fixing clamps 40. The bicycle is preferably driven from pedals P by means of a drive belt D rather than a chain and the front pulley 3 can incorporate a freewheel unit 5 and/or gearing.

21 Claims, 26 Drawing Figures

COLLAPSIBLE BICYCLES WITH TRIANGULAR FRAMES

This invention relates to bicycles which may be collapsed into a folded state wherein they will occupy less space for storage or transportation.

A number of bicycles having folding frame structures have been proposed in the past and although they reduce the space occupied by the bicycle to a more compact volume, generally existing folding bicycles are such that, in the folded state, they are still relatively bulky. Furthermore most folding bicycles are difficult to carry and it can be very fatiguing for the user to carry the folded bicycle for any distance It is an object of this invention to provide a collapsible bicycle which can be folded into a very compact state for ease of transportation either by the user or in or on another vehicle, and for storage in confined spaces.

Accordingly this invention provides a collapsible bicycle comprising a triangular frame formed from the interlinking of a forward strut, a rear strut, and a generally horizontal bottom strut which is connected to the other two struts at or near their lower ends, a wheel mounted at or near the lower ends of each of the forward and rear struts by supports, each of which is offset from the axis of the respective strut, whilst the upper ends of the forward and rear struts are interconnected in such a way that these two struts can be moved to lie alongside one another, after releasing a frame locking member on the bottom strut, so that the two wheels will lie side by side and with their respective offset supports positioned at opposite sides of the pair of wheels.

The simple triangular structure for the frame and the method of interlinking of the three struts enables the framework to be collapsed down to a very compact state wherein the struts are very close to one another with their longitudinal axes generally parallel and with the wheels close to one another. Indeed it is a preferred feature that the wheels should incorporate mutually engaging releasable locking members enabling the wheels to be interengaged, when lying alongside one another, so that they rotate about a common axis. Such a structure then takes the form generally of an elongated shaft carrying a double wheel at one end. Not only is this structure very compact but it also enables the user to transport the folded bicycle by grasping an upper portion of the folded frame members and wheeling the unit along the ground by means of the interlinked wheels.

In the preferred arrangement, for interconnection of the struts, the bottom strut is detachable from one of the other two struts and pivotally connected to the other of the two struts enabling the released bottom strut to be swung up alongside the other strut. Ideally the bottom strut will be connected to the forward strut by a pivot arrangement allowing the forward strut to rotate about its axis relative to the bottom strut. Additionally the upper ends of the forward and rear struts can be interconnected by a swivel joint allowing the forward strut to rotate about its axis relative to the rear strut also, the forward strut then acts as a steering member for the bicycle. Preferably the swivel joint will also interconnect the front and rear struts in the manner enabling them to be moved to lie alongside one another. The pivot arrangement advantageously comprises a releasable pivot pin and socket interconnection also providing the locking member. Thus the pivot arrangement may be interengaged by a releasable catch operated by a lever or other pressure release member. It is preferred that the mounting of the pivot arrangement on the forward strut should be adjustable. Another possibility is to provide that the pivot arrangement is slidably received on the forward strut so that, after release of the locking member, it may be slid up the forward strut as the forward strut is moved to lie alongside the rear strut. Another alternative is to provide a locking member in the form of a lockable hinge at a central position of the bottom strut with the ends of the bottom strut pivotally interconnected to the other two struts.

The bicycle may incorporate further frame members acting as stiffeners or strain bearing members between the three struts.

In the preferred embodiment a mounting on the rear strut carries a saddle. The mounting for the saddle must be adjustably secured to the rear strut and may also provide an attachment for a carrier for the bicycle.

It is additionally preferred that a support carrying handlebars should be mounted on the forward strut. Brake cables may lead from brake levers on the handlebars to brakes on one or both of the two wheels. Each brake may be a drum brake within the hub of the wheel.

Drive pedals are desirably mounted on the bottom strut and connected to drive one of the wheels. The drive member from the pedals to the wheel could be a belt or chain, and the drive pedals can be connected to a drive pulley or cog which incorporates a freewheel unit and/or a gearbox. If desired a drive motor could be connected to drive one of the wheels.

It is envisaged that the offset supports from the wheels will carry cantilevered axles on which the wheels are rotatably mounted.

The invention may be performed in various ways and preferred embodiments thereof will now be described with reference to the accompanying drawings, in which.

Figure 1:
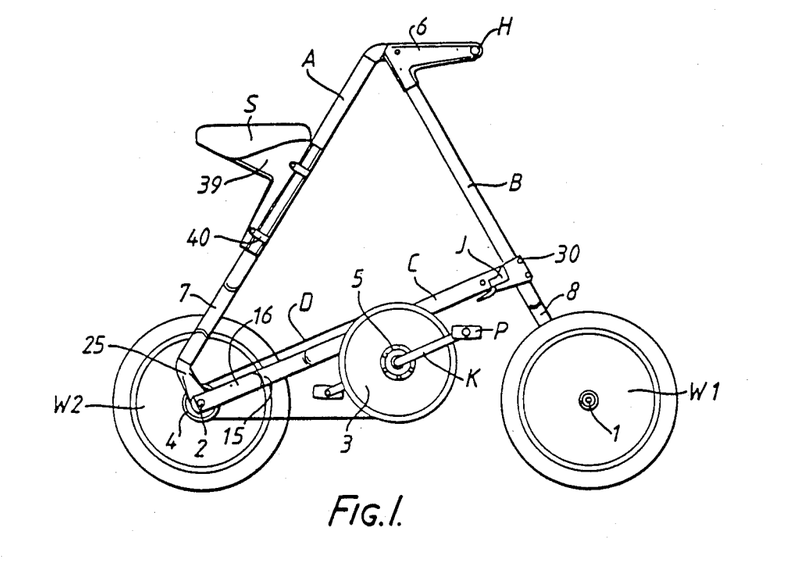
FIG. 1 illustrates the preferred form of bicycle of this invention in side view.
Figure 2:
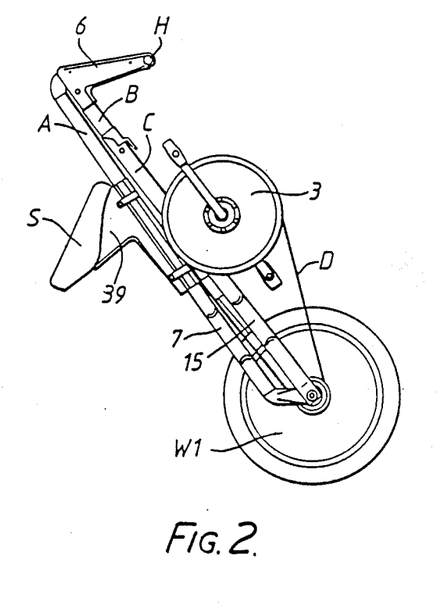
FIG. 2 shows the same bicycle in its folded condition.
Figure 3:
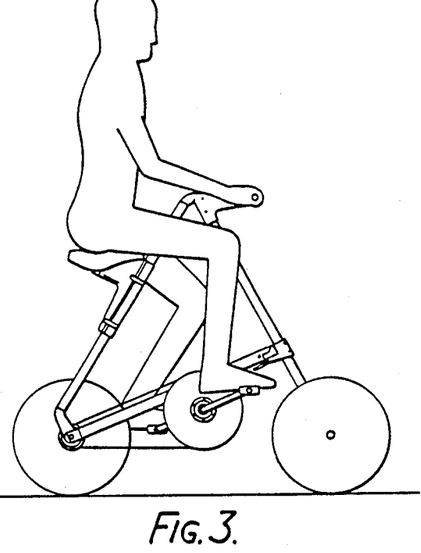
FIGS. 3 and 4 are views similar to those of FIG. 2 showing the bicycle in use.
Figure 4:
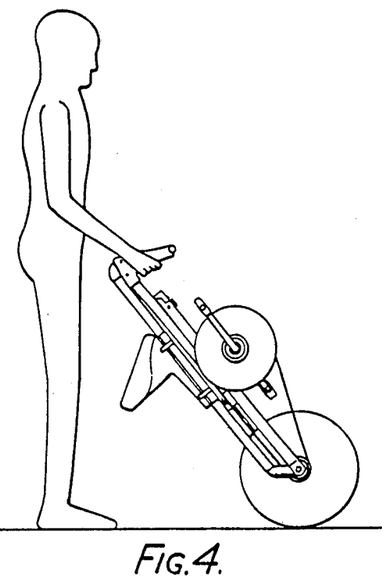

The bicycle shown in FIG. 1 is essentially constructed from a triangular frame formed by a rear strut A, a forward strut B and a bottom strut C. The lower end of the forward strut B provides an axle 1 for a front wheel W1 whilst the rear strut A provides, at its lower end, an axle 2 for a wheel W2. Mounted on the bottom strut C is a front pulley 3 provided with pedal cranks K and pedals P. This front pulley 3 is interconnected with a rear pulley 4, which drives the rear wheel W2, by a toothed drive belt D. A freewheel unit 5 is provided at the centre of the front pulley 3. A saddle S is mounted on the rear strut A and handlebars H are mounted at the top of the forward strut B. A releasable steering joint J enables the bottom strut C to be detached from the forward strut B and swung up to lie alongside the rear strut A. The forward strut B can then be swung back into alignment with the rear strut A so that the wheels W1 and W2 are brought into alignment as illustrated in FIG. 2. In this compact state the bicycle can be stowed in a small space or can be wheeled along using the support 6 for the handlebars H as a handle. This is illustrated in FIG. 4, whilst FIG. 3 shows the bicycle in its normal condition and in use.

Figure 2A:
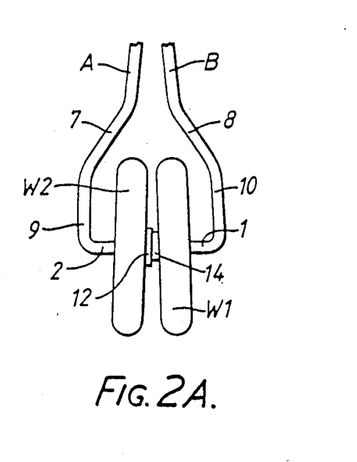
FIG. 2A is a diagrammatic front view of part of the folded bicycle shown in FIG. 2.

As can be seen from FIG. 2A the rear and forward struts A and B incorporate cranked portions 7 and 8 at their lower ends leading to supports 9 and 10 on which are mounted the rear axle 2 and the front axle 1. This offsetting of the supports for the wheels W1 and W2 enables the wheels to be aligned very closely to one another so that, in the folded state, the bicycle has a compact width. For simplicity the bottom strut C is not shown in FIG. 2A but this also incorporates a cranked portion 15 leading to an offset support 16 located about the rear axle 2. As can be seen from FIG. 5 the hub 11 of the rear wheel W2 carries a resilient collar 12. The hub 13 of the front wheel W1 carries a stud 14 which can be pushed, as a snap fit, into the collar 12 to link the hubs 11 and 13 together. This locks the bicycle in its folded 10 condition and allows the two wheels W1 and W2 to be wheeled along about the same axis. When the bicycle is to be reverted to its normal condition the wheels W1 and W2 are prised apart so that the stud 14 snaps out of the collar 12.

Figure 5:
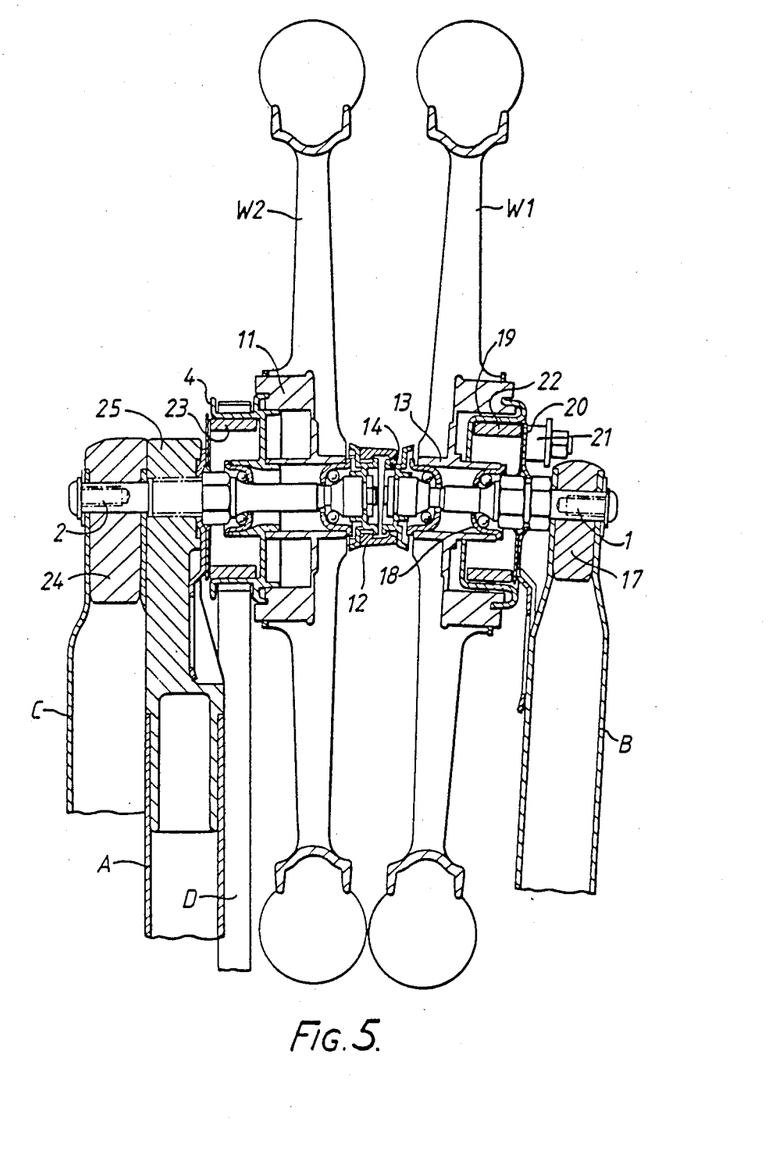
FIG. 5 is a cross-sectional detail through the wheels of the bicycle in the folded condition.

FIG. 5 also illustrates additional features of the mountings of the wheels W1 and W2 to the ends of the rear and forward struts A and B. The front axle is securely fitted into a front end cap 17 fixed into the lower end of the forward strut B and is mounted within the wheel W1 by a standard bicycle cup and cone bearing 18. A brake drum 19 is fitted into the hub of the wheel W1 and a brake back plate assembly 20 carries a brake actuator 21 which operates brake shoes 22. The rear pulley 4 is mounted on the wheel hub 11 of the wheel W2 and also acts as a brake drum which incorporates brake shoes 23 actuated by a separate brake actuator (not shown). The rear axle 2 is mounted in an end cap 24 fixed within the end of the bottom strut C. The rear axle 2 then passes through a solid end member 25 (see also FIG. 1) fitted into the end of the rear strut A.

Figure 6:
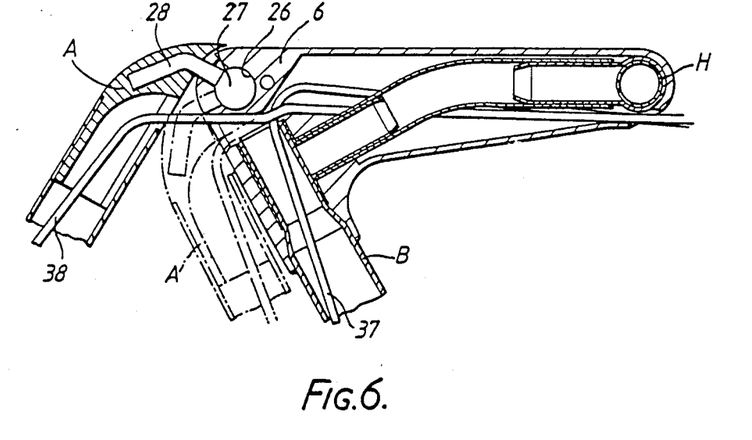
FIG. 6 is a cross-sectional detail of the top joint of the bicycle.
Figure 7:
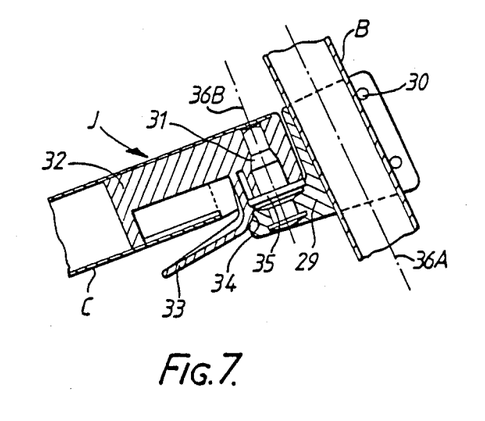
FIG. 7 is a cross-sectional detail of a lower joint of the bicycle.

FIG. 6 illustrates particular features of the support 6 providing a mounting for the handlebars H. This support also has the forward strut B fixed therein and at its upper corner provides a socket joint 26 for a ball 27 having an extension 28 which is secured within the top of the rear strut A. The ball and socket joint 26, 27 allows the struts A and B to be rotated relative to one another so that the rear strut A can be moved into the position illustrated in dashed outline, adjacent to the forward strut B, when the bicycle is being put into its folded position. When the bicycle is in its normal position the ball and socket joint 26, 27 also allows the forward strut B to rotate and act as a steering shaft (with respect to the rest of the bicycle) for the front wheel W1. The forward strut B also rotates with respect to the joint J. As shown in FIG. 7 this joint J comprises a sleeve 29 fixed to the forward strut B by clamping screws 30 and carrying a steering pin 31 received within a front bush 32 extending from the end of the bottom strut C. A resilient finger 33 can be pressed upwardly to release a catch 34 from a collar 35 on the steering pin 31 when the bottom strut C is to be disengaged from the forward strut B. It will be noted that the steering axis 36A of the front strut B is displaced from the axis 36B of the steering pin 31 which provides a suitable offset which then provides the necessary trail for the front wheel W1 during steering.

FIG. 6 also illustrates a pair of brake cables 37,38 which lead through the support 6 to brake levers (not shown) carried by the handlebars H. The cable 37 leads down through the forward strut B to the brake actuator 21 for the front wheel W1 while the other cable 38 leads down through the rear strut A to the brake actuator for the rear wheel W2.

Referring again to FIGS. 1 and 2 it will be noted that the saddle S is mounted on a sleeve support 39 which is fixed by clamps 40 onto the rear strut A. The clamps 40 can be released to allow the sleeve support 39 to be slid to a desired position on the rear strut A to suit a particular person. Further adjustment of the overall relationship of the parts of the bicycle can be achieved by releasing the clamp screws 30 and moving the joint J to a new position relative to the forward strut B.

It is envisaged that the struts A, B and C will be formed from aluminium tubing and other parts can be formed from diecast aluminium or rigid plastics materials, for example. The drive belt D will desirably be a dry glass fibre reinforced belt faced with nylon but it will be appreciated that, for some purposes, a chain drive may be preferred. It is envisaged that when the bicycle is in its folded condition the bottom strut C will fit against the forward strut B or into the valley formed by the struts A and B. If necessary, however, an additional clip may be provided to hold the bottom strut C in place when the bicycle is in the folded condition As a further modification a bag or shopping support could be provided for attachment to the support sleeve 39 below the saddle S. The bicycle could also incorporate gears, such as in the form of an epicyclic gearbox mounted in the front pulley 3. It is also envisaged that the bicycle could be provided with electric power by means of a simple motor and battery system driving the front wheel.

Some variations on the basic concept of the bicycle are shown in FIGS. 8 to 15.

Figure 8:
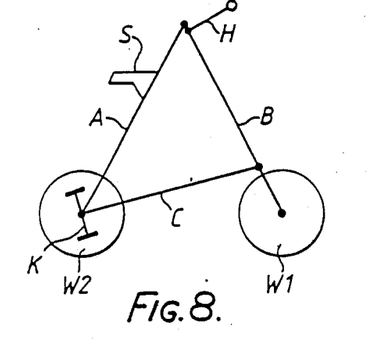
FIGS. 8 to 25 are diagrammatic illustrations, in side view, of a number of variations to the basic design of the bicycle from that as shown in FIGS. 1 to 7.
Figure 9:
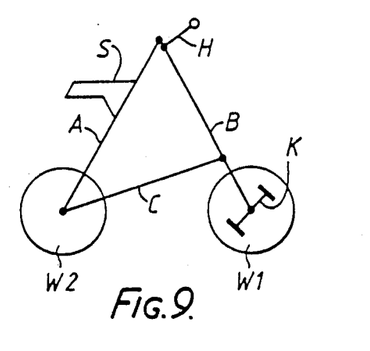
Figure 10:
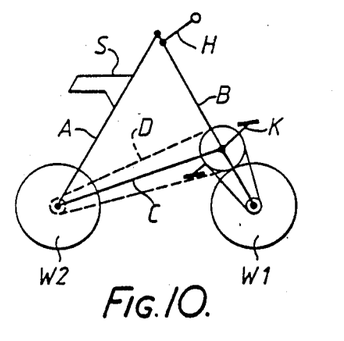

FIG. 8 shows mounting of the drive cranks K co-axially with or near to the rear wheel mounting and driving the rear wheel W2, whilst FIG. 9 shows the cranks K mounted co-axially with or near to the front wheel mounting and driving the front wheel W1. FIG. 10 shows an embodiment in which the cranks K are mounted on or near the bottom joint between the steering strut B and the bottom strut C driving front or rear wheels.

Figure 11:
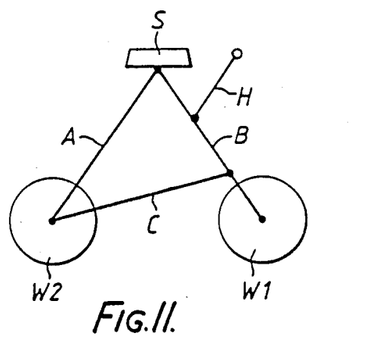

FIG. 11 shows how the seat can be mounted directly on the upper joint between the rear strut A and the steering strut B.

Figure 12:
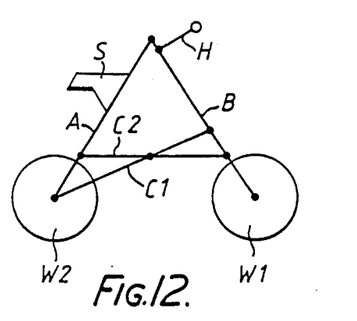
Figure 13:
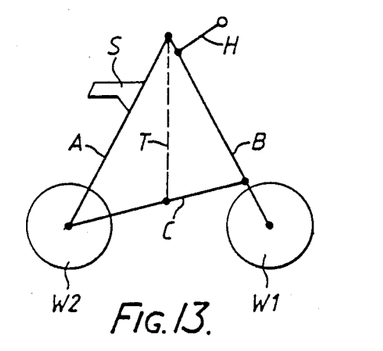
Figure 14:
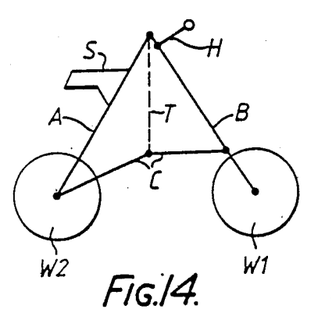

FIG. 12 shows the provision of two bottom struts C1 and C2 for added rigidity when the bicycle is in use. In FIG. 13 a tension wire T is added between a point on the bottom strut C and the upper joint connecting struts A and B to provide additional strength. FIG. 14 shows an embodiment in which the bottom member is in two pieces and supported by a tension member T.

Figure 15:
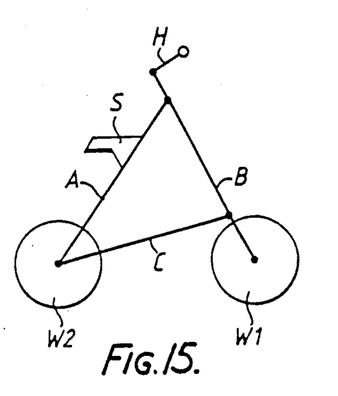
Figure 16:
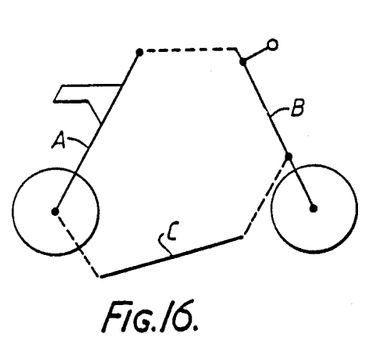
Figure 17:
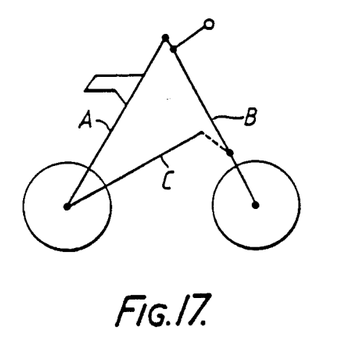
Figure 18:
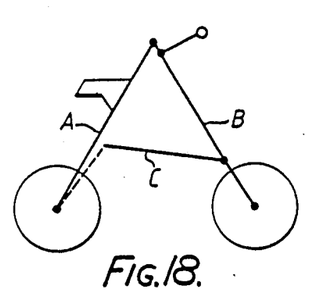
Figure 19:
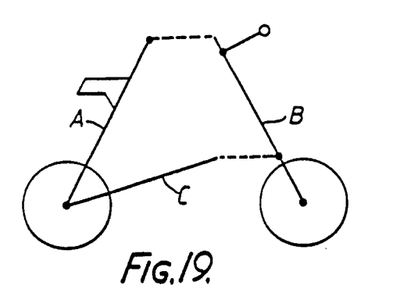

FIG. 15 shows the steering strut B extended beyond the upper joint connecting the struts A and B so that the handlebars H can be mounted on the upper extension.

FIGS. 16 to 19 show variations of how the folding struts A, B and C come apart from each other at some or all of the joints shown. They will then be laid alongside one another to form the compact folded structure similar to that of FIG. 2.

Figure 20:
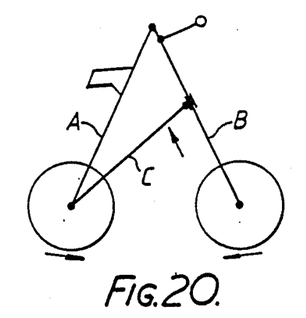
Figure 21:
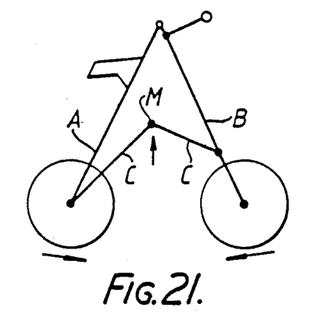

FIG. 20 shows the joint between the struts B and C remaining attached but slidable as the two struts A and B are folded towards one another. FIG. 21 shows a hinge M approximately midway of the strut C so that this strut C can fold upwardly or downwardly as required.

Figure 22:
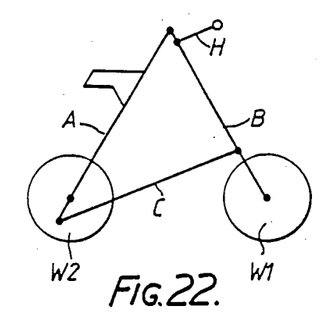
Figure 23:
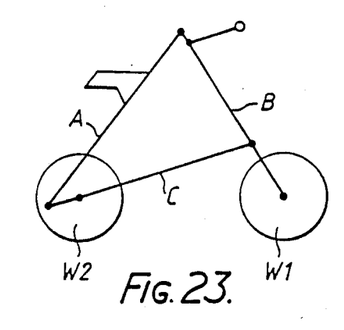

FIGS. 22 to 25 show variations in the rear wheel attachment. In FIG. 22 the rear strut is extended downwardly from the hub of the wheel W2 to form an attachment for the rear end of the bottom strut C, whilst FIG. 23 shows the rear end of the bottom strut C extending beyond the wheel hub of wheel W2 to join the rear strut A.

Figure 24:
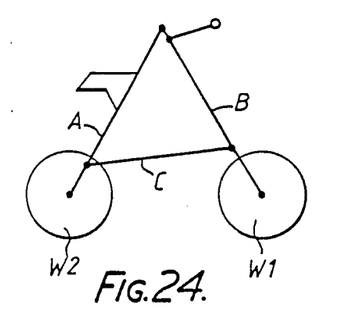

FIG. 24 shows the attachment of the bottom member C to the rear strut A and the steering strut B, in both instances at points above the connection of the other two struts to the hubs of wheels W2 and W1.

Figure 25:
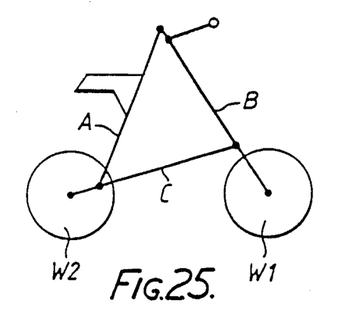

FIG. 25 shows an alternative embodiment in which the bottom strut C is attached to the steering strut B above the lower connection of strut B with the hub of the wheel W1, whilst the lower end of the rear strut A is connected at a point forward of the connection of therear end of the member C to the hub of wheel W2.

The handlebars can be of any suitable shape and could be made as folding structures. Thus they can be adjustable in height and angle and foldable inwardly or outwardly of the plane of the frame or alternatively swing into a vertical plane.

I claim:

1. A collapsible bicycle comprising a triangular frame formed from the interlinking of a forward strut, a rear strut, and a generally horizontal bottom strut which is connected to the other two struts at or near their lower ends, a wheel mounted at or near the lower ends of each of the forward and rear struts, each wheel being carried by a support which is offset from the axis of the respective strut, whilst the upper ends of the forward and rear struts are non-fixedly interconnected so that these two struts can be moved to lie alongside one another, after releasing a frame locking member on the bottom strut, so that the two wheels will lie side by side and with their respective offset supports positioned at opposite sides of the pair of wheels.

2. A bicycle according to claim 1, wherein the bottom strut is detachable from one of the other two struts and pivotally connected to the other of the two struts enabling the released bottom strut to be swung up alongside the other strut.

3. A bicycle according to claim 1, wherein the bottom strut is connected to the forward strut by a pivot arrangement allowing the forward strut to rotate about its axis relative to the bottom strut.

4. A bicycle according to claim 3, wherein the upper ends of the forward and rear struts are interconnected by a swivel joint allowing the forward strut to rotate about its axis relative to the rear strut also.

5. A bicycle according to claim 4, wherein the swivel joint also interconnects the front and rear struts in the manner enabling them to be moved to lie alongside one another.

6. A bicycle according to claim 3, wherein the pivot arrangement comprises a releasable pivot pin and socket interconnection also providing the locking member.

7. A bicycle according to claim 6, wherein the pivot arrangement is interengaged by a releasable catch operated by a lever or other pressure release member.

8. A bicycle according to claim 6, wherein the mounting of the pivot arrangement on the forward strut is adjustable.

9. A bicycle according to claim 3, wherein the pivot arrangement is slidably received on the forward strut so that, after release of the locking member, it may be slid up the forward strut as the forward strut is moved to lie alongside the rear strut.

10. A bicycle according to claim 3, wherein the locking member is a lockable hinge at a center position on the bottom strut and the ends of the bottom strut are pivotally interconnected to the other two struts.

11. A bicycle according to claim 1, wherein the wheels incorporate mutually engaging releasable locking members enabling the wheels to be interengaged, when lying alongside one another, so that they rotate about a common axis.

12. A bicycle according to claim 1, wherein a mounting on the rear strut carries a saddle.

13. A bicycle according to claim 12, wherein the mounting for the saddle is adjustably secured to the rear strut.

14. A bicycle according to claim 12, wherein the mounting for the saddle provides an attachment for a carrier for the bicycle.

15. A bicycle according to claim 1, wherein a support carrying handlebars is mounted on the forward strut.

16. A bicycle according to claim 15, wherein brake cables lead from brake levers on the handlebars to brakes on one or both of the two wheels.

17. A bicycle according to claim 16, wherein each brake is a drum brake within the hub of the wheel.

18. A bicycle according to claim 1, wherein drive pedals are mounted on the bottom strut and connected to drive one of the wheels.

19. A bicycle according to claim 18, wherein the drive member from the pedals to the wheel is a belt or chain.

20. A bicycle according to claim 18, wherein the drive pedals are connected to a drive pulley or cog which incorporates a freewheel unit or a gearbox.

21. A bicycle according to claim 1, wherein the offset supports for the wheels carry cantilevered axles on which the wheels are rotatably mounted.

* * * * *